United States Patent [19]
Morimoto et al.

[11] Patent Number: 4,981,372
[45] Date of Patent: Jan. 1, 1991

[54] COMPONENT SHAPE RECOGNITION METHOD

[75] Inventors: Masamichi Morimoto, Osaka; Kazumasa Okumura, Uji; Akira Mohri, Hirakata; Daisuke Ohkawara, Itami, all of Japan

[73] Assignee: Matsushita Electric Industrial Co., Ltd., Kadoma, Japan

[21] Appl. No.: 260,998

[22] Filed: Oct. 21, 1988

[30] Foreign Application Priority Data

Oct. 23, 1987 [JP] Japan ................................. 62-268618

[51] Int. Cl.$^5$ .............................................. G06K 9/00
[52] U.S. Cl. ........................................ 382/8; 358/107; 356/375; 356/376
[58] Field of Search ............................ 382/8; 358/107; 356/376, 375

[56] References Cited
U.S. PATENT DOCUMENTS 4,821,157 4/1989 Birk et al. ................................. 382/8
4,830,497 5/1989 Iwata et al. ........................... 356/394

Primary Examiner—Leo H. Boudreau
Assistant Examiner—Daniel Santos
Attorney, Agent, or Firm—Cushman, Darby & Cushman

[57] ABSTRACT

A boundary of leads of an integrated circuit component shown by binary picture elements on a recognition plane of an image display means is detected by a conventional boundary detecting method, and respective corners of the leads are detected on the basis of variation of an angle between a predetermined axis and a line connecting two picture elements having a predetermined distance from each other on the boundary. Moreover, a shape of the lead is recognized on the basis of the shapes of the corners. Subsequently, a search zone containing a tip portion of one lead is set by referring the midpoint of the tip of the lead, and is scanned by horizonal scanning lines and vertical scanning lines. Then segments of both the scanning lines overlapping on the tip portion are obtained, and a protruding direction of the lead is detected referring to a segment touching on a boundary of a search zone. Furthermore, a midpoint of the tip is calculated from coordinate values of plural segments crossing the tip portion.

1 Claim, 9 Drawing Sheets

COMPONENT SHAPE RECOGNITION METHOD

FIELD OF THE INVENTION AND RELATED ART STATEMENT

1. Field of the Invention

The present invention relates generally to a shape recognition method, and more particularly to a component shape recognition method for recognizing a position of an integrated circuit component having a plurality of leads on the circumference thereof.

2. Description of the Related Art

In order to recognize a position of an integrated circuit component having a plurality of leads on the circumference thereof in the conventional art, as shown in FIG. 15, straight lines $L_1$ and $L_2$ which are parallel to an X-axis and a Y-axis of an orthogonal coordinates, respectively, are arranged across the respective comb-like lead wires (hereafter simply leads) on an image which are generated by an image display means such as a video imaging system. Intersection points 13 of center lines of the respective leads 12 and the straight line $L_1$ or $L_2$ are detected. Subsequently, the position of the integrated circuit component 11 is recognized by detecting an intersection point Q of two lines $L_3$ and $L_4$ connecting the respective intersection points 13 of four leads 12 (for example, leads 12A, 12A and 12B, 12B) which are directed in opposite directions on both sides of the integrated circuit component, in the vertical direction and the horizontal direction, respectively. Furthermore, a turned angle of the integrated circuit component 11 is detected from the inclination of the straight lines $L_3$ and $L_4$ with respect to the orthogonal coordinates.

In the above-mentioned method, in the case that the integrated circuit component 11 is rotated with respect to the orthogonal coordinates in the image of the display apparatus, as shown in FIG. 16, some leads 12 (for example, leads 12C) do not cross the straight lines $L_1$ and $L_2$ which are parallel to the X-axis and Y-axis of the orthogonal coordinate, thus recognition of the position of the lead or the integrated circuit component 11 is impossible. On the other hand, when a lead 12 has some particulates on the crossing portion with the straight lines $L_1$ or $L_2$, a problem of producing an error in the detection of a position arises.

OBJECT AND SUMMARY OF THE INVENTION

An object of the present invention is to provide a component shape recognition method which enables recognition of the shape of a component which is placed at a rotated or tilted position with respect to a coordinate axis.

Another object of the present invention is to provide a component shape recognition method which can recognize a component without a large error even in the case of a lead having particulates.

The component shape recognition method in accordance with the present invention comprises the steps of:

detecting the boundary of an object on a recognition plane of image display means, detecting corners of the object on the basis of variations of an angle between a predetermined axis and a line connecting two picture elements having a predetermined distance therebetween on the boundary, detecting the shape of the object on the basis of positions and shapes of the corners, detecting a midpoint of a tip portion of the object, setting a search zone containing the tip portion of the object on the recognition plane, to be scanned by horizontal scanning lines and vertical scanning lines, creating data of positions of the tip portion on the basis of the horizontal scanning lines and the vertical scanning lines, calculating segments of the horizontal scanning lines and the vertical lines overlapping with the object, detecting a protruding direction of the tip portion on the basis of a segment touching on a boundary of the search zone, and detecting a midpoint of the tip portion by calculating an average of coordinate values of plural segments crossing the tip portion.

DESCRIPTION OF THE PREFERRED EMBODIMENT

Figure 1:
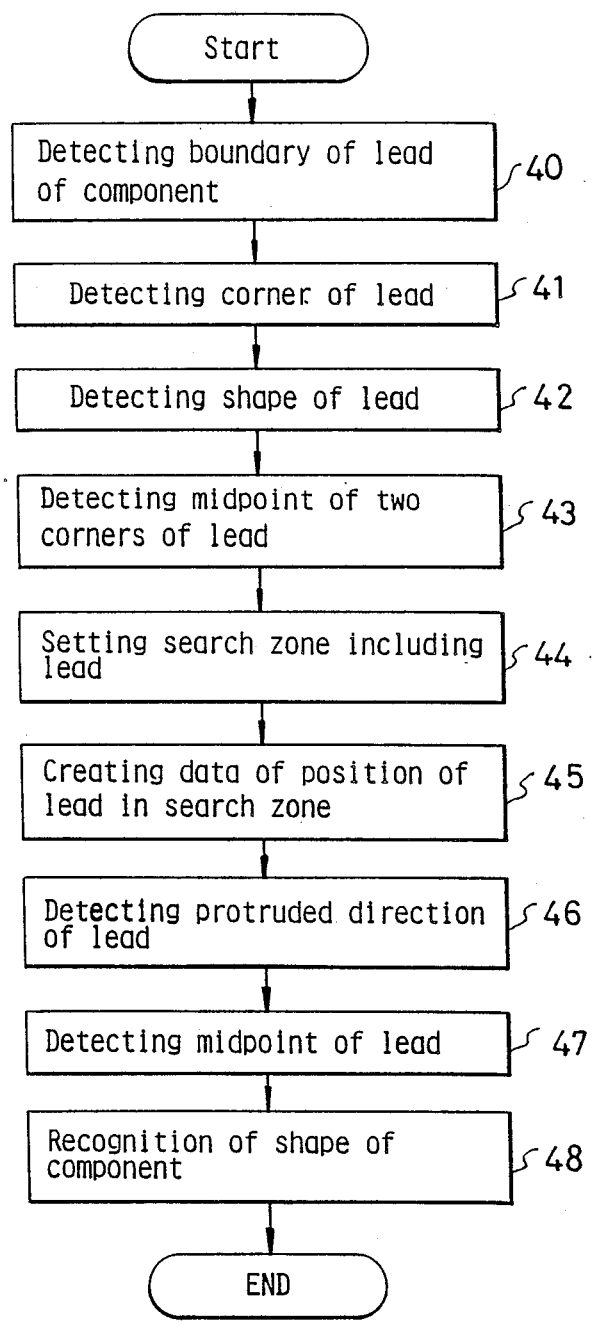
FIG. 1 is a flow chart of an embodiment of a component shape recognition method in accordance with the present invention.

FIG. 1 is a flow chart showing the process of an embodiment of the component shape recognition method in accordance with the present invention. The respective steps of the process are elucidated referring to FIG. 2–FIG. 13.

Figure 2:
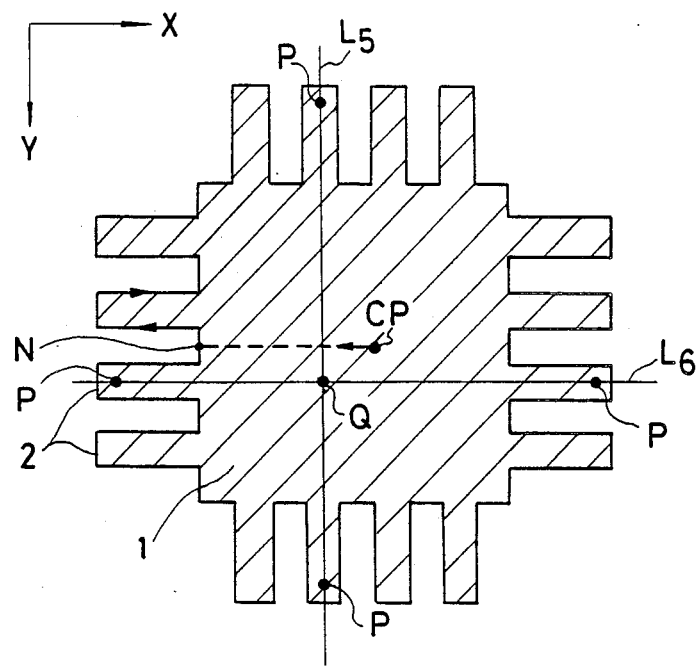
FIG. 2 is an image of a video image display showing a silhouette of an integrated circuit component.

In FIG. 2, an image 1 of an integrated circuit component having a plurality of leads on the circumferential portion thereof is displayed on a recognition plane by means of a video imaging apparatus. The image 1 is displayed by "binary image" in which an image is shown by black picture elements and white picture elements. The recognition plane is divided into a plurality of picture elements, and positions of the respective picture elements are recognized on X-Y coordinates.

Figure 3:
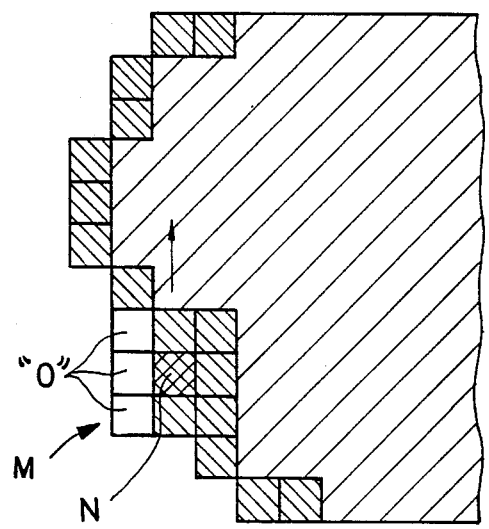
FIG. 3 is an explanatory drawing for showing a detecting method of a boundary.

A boundary of the integrated circuit component displayed on the recognition plane is detected on the basis of the image 1. Firstly, as shown in FIG. 2, a detecting point N is moved leftward from the center CP of the recognition plane, and the boundary is detected by a change of color of the picture element, for example, the picture element turns from black to white at the boundary in FIG. 2. After that, the boundary of the image 1 is detected by tracing it clockwise. As shown in FIG. 3, a mask M composed of eight picture-elements surrounding the detecting point N are examined, and the color of the respective picture elements is distinguished. Subsequently, a moving direction of the mask M is selected by the following method so as to trace the boundary. When some picture elements "O" are white and the detecting point N is black the detecting point N is on the boundary, and the mask M is moved upward by one picture element as shown in FIG. 3. Then, the color of the respective picture elements of the mask M is distinguished in that place, and the moving direction of the mask M is selected so that plural white picture elements are always present in the mask M and the detecting point N is black. Consequently, the mask M traces the boundary and the data thereof are created.

Figure 4:
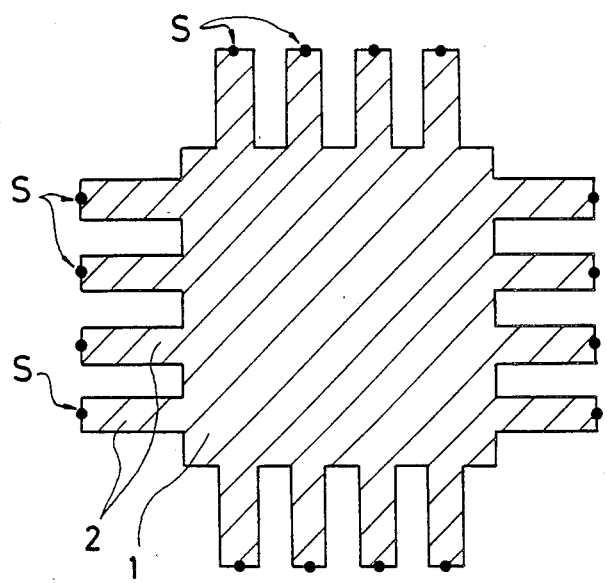
FIG. 4 is an explanatory drawing showing a process for detecting tips of leads.
Figure 5:
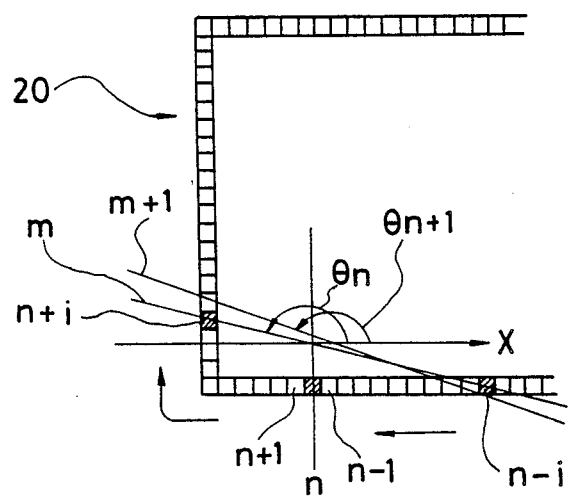
FIG. 5 is a figure showing a method for detecting a corner of the lead.

Secondly, as shown in FIG. 4, positions S of the tips of the respective lead 2 are detected on the basis of data of the boundary detected by the above-mentioned process. Subsequently, as shown in FIG. 5, a picture element n+i is selected at a position counted clockwise by a predetermined number of picture elements from a picture element n on the boundary 20. In a similar manner, a picture element n−i is selected at a position counted counterclockwise by the predetermined number of picture elements from the picture element n. Then, a line m is set across the picture element n+i and the picture element n−i, and, an angle $\theta_n$ (n: natural number) between the line m and X-coordinate of the line m is calculated. Furthermore, two other picture elements which are counted clockwise or counterclockwise by the predetermined number of picture elements from a picture element n+1 are selected in a similar manner, respectively, and a line m+1 passing through both of the other picture elements is drawn. Then, an angle $\theta_{n+1}$ between the line m+1 and the X-coordinate is calculated. Then, a difference between the angles $\theta_n$ and $\theta_{n+1}$ is calculated. A process similar to the above-mentioned process is applied to the respective picture elements on the boundary, and the angle variation $\Delta\theta$ ($\Delta\theta = \theta_n - \theta_{n+1}$) is calculated. In the above-mention calculation, the angle variation $\Delta\theta$ is a positive value for a protruded corner since the angle $\theta_n$ is larger than the angle $\theta_{n+1}$. On the contrary, the angle variation $\Delta\theta$ is a negative value for a recessed corner since the angle $\theta_n$ is less than the angle $\theta_{n+1}$.

Figure 6:
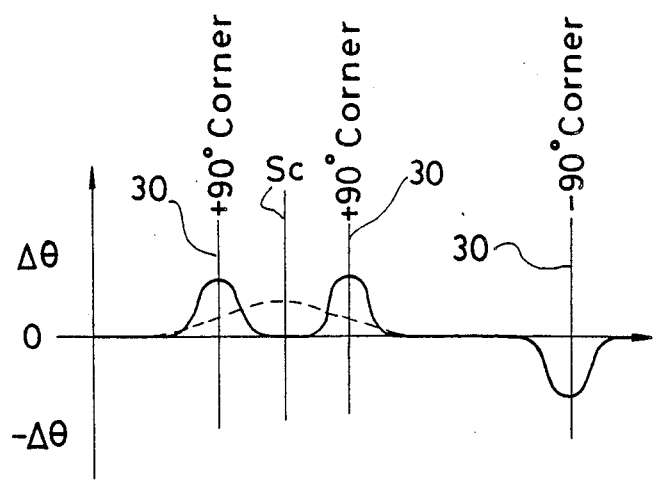
FIG. 6 is a graph for showing corners of the lead.
Figure 7:
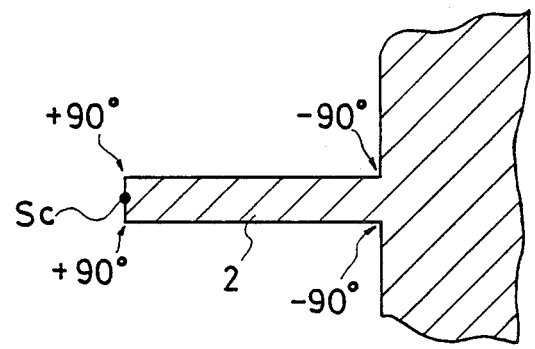
FIG. 7 shows a method for detecting a midpoint Sc of the end of the lead.

FIG. 6 is a graph showing the angle variation $\Delta\theta$. In the graph, a protruded corner is designated with "+90° corner" and a recess corner is designated with "−90° corner". In FIG. 5, the angle variation $\Delta\theta$ has a maximum value when the picture element n is placed at the corner of the boundary. Consequently, in FIG. 6, the position of a line 30 passing through the peak of the waveform shows a corner of the boundary, and thereby the positions of the respective corners can be recognized. Furthermore, a midpoint Sc of the tip of a lead 2 can be detected as an intermediate position of two neighboring +90° corners.

In case that the number of picture elements which are present on a boundary between the picture element n+i and n−i is larger than a predetermined number, the angle variation $\Delta\theta$ on the +90° corner or −90° corner is relatively low, but the angle variation $\Delta\theta$ becomes maximum at the center of two neighboring 90° corners as shown by a dotted line in FIG. 6. Consequently, the midpoint Sc of the tip of a lead can be detected by a relatively simplified process. In the above-mentioned manner, precise detection can not be expected. In the present invention, however, precise detection of the midpoint Sc of the lead 2 is not required. Thus, in order to simplify the process, a number of picture elements can be selected with a predetermined interval, thereby the midpoint Sc of the lead 2 can be detected by reduced data processing.

Figure 8:
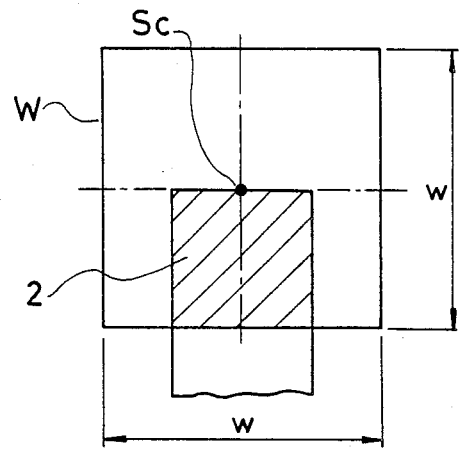
FIG. 8 is an explanatory drawing of a process for detecting the midpoint Sc.
Figure 9:
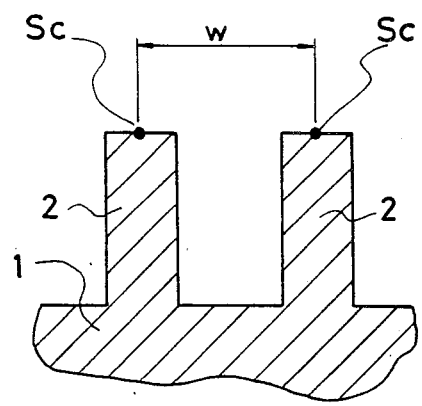
FIG. 9 shows an interval w of neighboring two leads.

FIG. 8 is a plan view of a search area (hereinafter is referred to as "window W") which is positioned on the tip of the lead 2 by adjusting the center of the window W to the midpoint Sc. The window W is substantially square, and the size of the square is selected so as to be equal to a distance between the centers Sc of two neighboring leads 2 as shown in FIG. 9. Consequently, the tip portion of only one lead 2 is placed in the window W.

Figure 10:
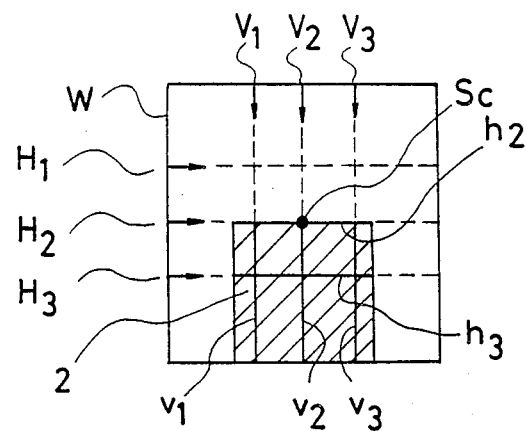
FIG. 10, FIG. 11 and FIG. 12 are illustrations of a process for detecting the direction of the lead.
Figure 11:
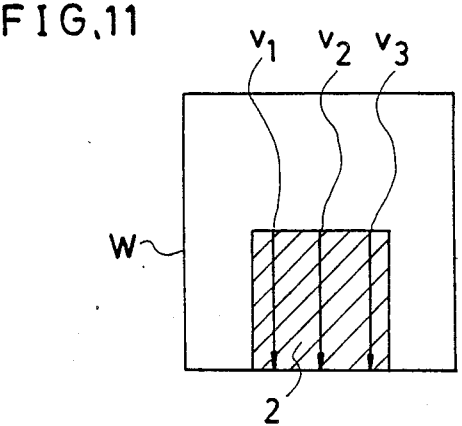
Figure 12:
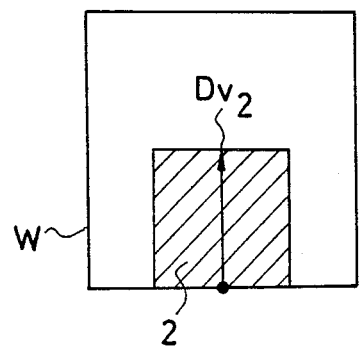

In FIG. 10, the window W is scanned by horizontal scanning lines $H_1$, $H_2$ and $H_3$ and vertical scanning lines $V_1$, $V_2$ and $V_3$. Then, segments of the respective vertical lines $V_1$, $V_2$ and $V_3$ passing on the lead 2 are designated as $v_1$, $v_2$ and $v_3$, respectively, and segments of the horizontal scanning lines of the horizontal scanning lines $H_2$ and $H_3$ passing on the lead 2 are designated as $h_2$ and $h_3$, respectively. Then, position data representing positions of the ends of the respective segments are detected, and as shown in FIG. 11, the segments $v_1$, $v_2$ and $v_3$ which contact an edge of the window W are selected from the above-mentioned segments $v_1$, $v_2$, $v_3$, $h_2$ and $h_3$. Subsequently, as shown in FIG. 12, a segment $Dv_2$, for example, is calculated on the basis of the position data. Then, a direction of the lead 2 is detected from a direction of the segment $Dv_2$ which makes contact at one end to the edge of the window W. In the case that the lead 2 is oblique in the window W, sometimes both the horizontal segments $h_1$, $h_2$ . . . and the vertical segments $V_1$, $V_2$ . . . contact the edge of the window W. In the above-mentioned case, the direction of the lead 2 is recognized on the basis of segments which are more in number.

Figure 13:
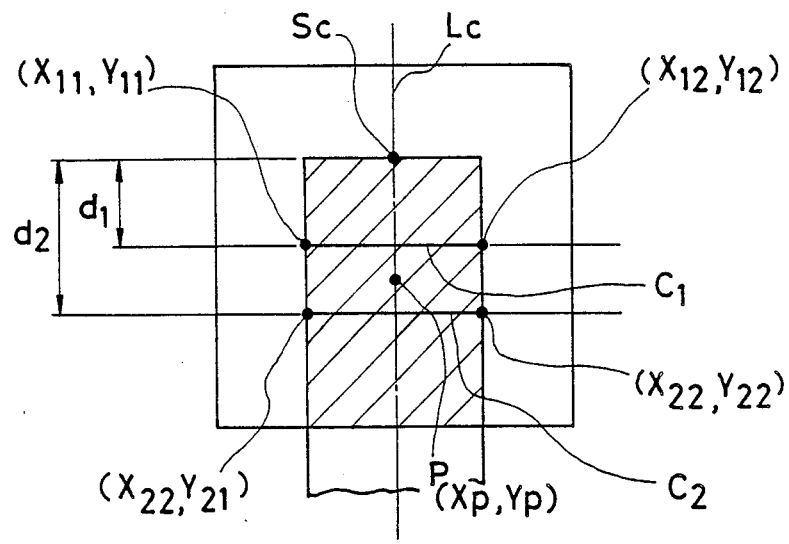
FIG. 13 illustrates a process for detecting a position P on the center line of the lead.

After recognition of the direction of the lead 2, as shown in FIG. 13, two lines $C_1$ and $C_2$ which are parallel to the horizontal side of the window W are set on positions having distances of $d_1$ and $d_2$ from the midpoint Sc, respectively. Then coordinate values $(X_{11}, Y_{11})$, $(X_{12}, Y_{12})$, $(X_{21}, Y_{21})$ and $(X_{22}, Y_{22})$ of intersections of the boundary of the lead 2 and the two lines $C_1$ and $C_2$ are calculated, and a position P (coordinate values $(X_p, Y_p)$) which is on the center line Lc of the lead 2 is detected by calculating average values of the respective coordinate values. The above-mentioned calculation is shown by the following equations;

$$X_p = (X_{11} + X_{12} + X_{21} + X_{22})/4 \brace Y_p = (Y_{11} + Y_{12} + Y_{21} + Y_{22})/4 \quad (1)$$

Figure 14A:
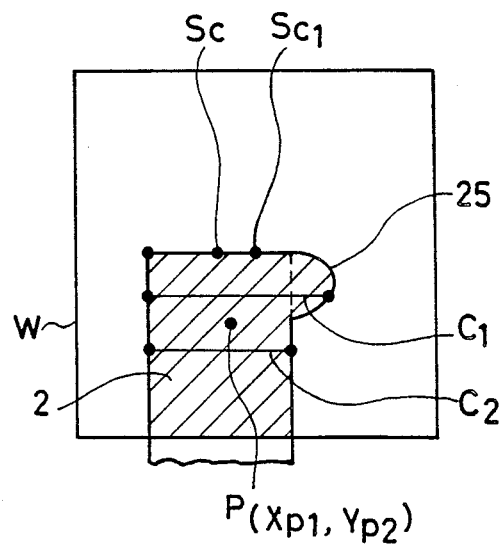
FIGS. 14(a), (b) and (c) illustrate errors of the lead having a particulate thereon in the center-detection-method.

Consequently, positions P of the respective lead 2 of the integrated circuit component 1 are detected. Furthermore, as shown in FIG. 2, the position of the integrated circuit component 1 is recognized by detecting an intersection Q of two lines $L_5$ and $L_6$ connecting the positions P of pairs of leads which are directed in opposite directions on both sides of the integrated circuit component in the vertical direction and the horizontal direction, respectively. Inclination of the lines $L_5$ and $L_6$ with respect to the X-axis and Y-axis can be also recognized. In the present invention, the window W is set on the basis of the midpoint Sc of the lead 2, and the position P of the lead is recognized on the basis of an average of the data of positions of plural segments. Therefore, even if a particulate 25 is put on the end of the lead 2, and the midpoint $Sc_1$ is not recognized at the true midpoint Sc of the lead 2 as shown in FIG. 14(a), a position $P(X_{P1}, Y_{P1})$ on the basis of an average of the data of the segments $C_1$ and $C_2$ is approximate to the true position $P(X_p, Y_p)$.

Figure 14B:
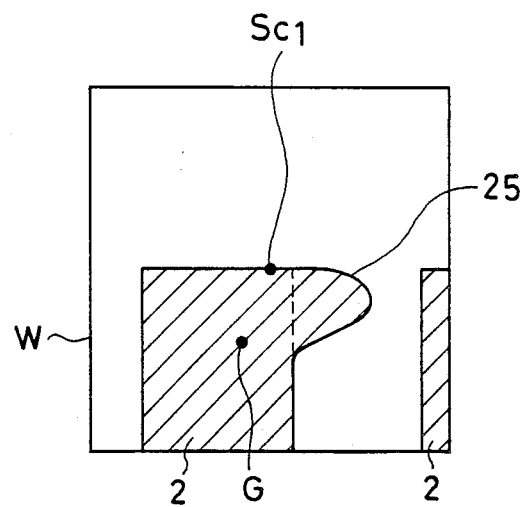
Figure 14C:
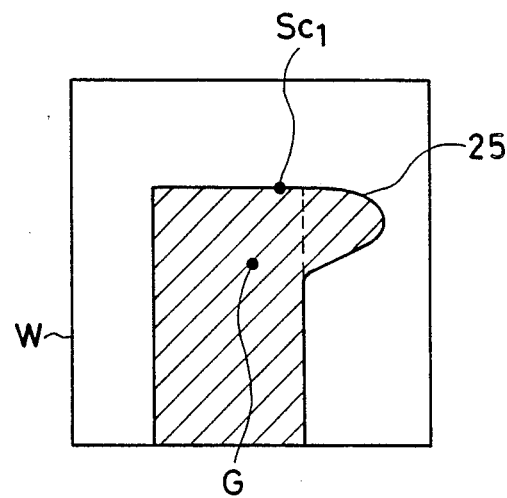
Figure 15:
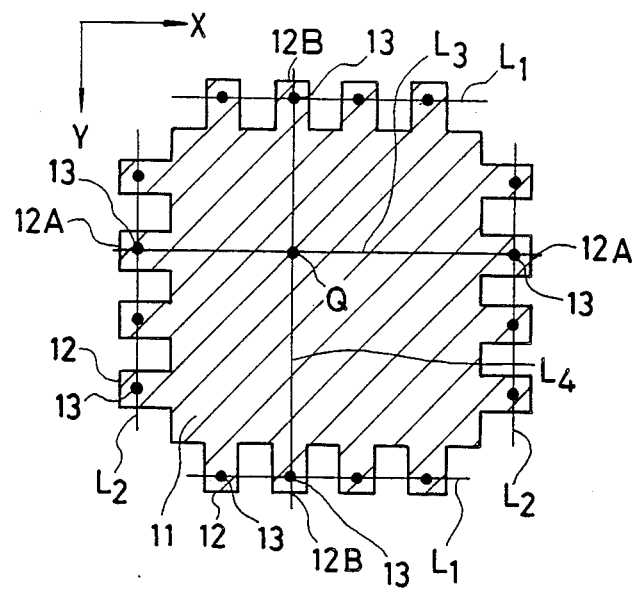
FIG. 15 illustrates a component shape recognition method in a conventional art.
Figure 16:
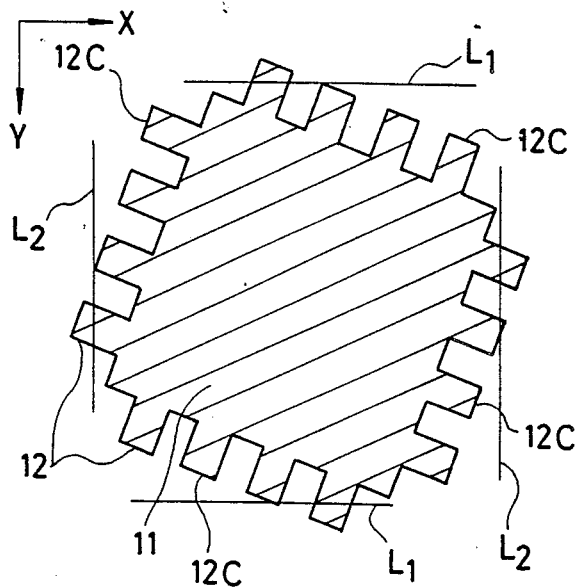
FIG. 16 illustrates an example wherein the conventional component shape recognition method is not applicable to the integrated circuit component which is positioned obliquely with respect to orthogonal coordinates.

In the case that the particulate 25 is put on the end of the lead 2 as mentioned above, the lead 2 is positioned in the mask M in a manner that the detected midpoint $Sc_1$ is placed at the center of the mask M as shown in FIG. 14(b). Namely, the lead 2 is shifted leftward in the mask and a lead which neighbors the lead enters in the mask, and thereby, recognition of the lead is impossible. In order to avoid this disadvantage, a gravity center G of the portion of the lead which is present in the mask M is calculated, and the gravity center G is placed on the center of the mask M as shown in FIG. 14(c). Thus, only one lead 2 is shown in the mask M.

In the embodiment, though the method for recognizing the position of the integrated circuit component is elucidated, the method is applicable to recognize inclination or bend of a lead or to calculate an interval between two neighboring leads and the length of a lead. Moreover, the method of the present invention is applicable to recognize the position or shape of various components.

As mentioned above, according to the component shape recognition method of the present invention, the position of a tip of a lead of an electronic component can be detected by means of simplified data processing, and the time necessary for the data processing is reduced. Furthermore, a precise recognition of the shape is realized even if the electronic component is rotated with respect to predetermined X-Y coordinates on the recognition plane, or even if particulates are present on a detected portion of the lead of the electronic component.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A component shape recognition method comprising the steps of:
    detecting a boundary of an object on a recognition plane of an image display means,
    detecting corners of said object on the basis of variation of an angle between a predetermined axis and a line connecting two picture elements having a predetermined distance on said boundary,
    detecting a shape of said object on the basis of positions and shapes of said corners,
    detecting a midpoint of a tip portion of said object,
    setting a search zone containing said tip portion of said object on said recognition plane, to be scanned by horizontal scanning lines and vertical scanning lines,
    calculating segments of said horizontal scanning lines and said vertical lines overlapping with said object on the basis of the respective coordinate values,
    creating data of positions of said tip portion of coordinate values on said horizontal scanning lines and coordinate values on said vertical scanning lines,
    detecting a protruded direction of said tip portion on the basis of a segment touching on a boundary of said search zone, and
    detecting a midpoint in a cross direction of said tip portion by calculating an average of said coordinate values of plural segments crossing said tip portion.

* * * * *